May 21, 1963 P. F. SALISBURY ET AL 3,090,377
BLOOD PRESSURE MEASUREMENT
Filed Oct. 30, 1961 5 Sheets-Sheet 1
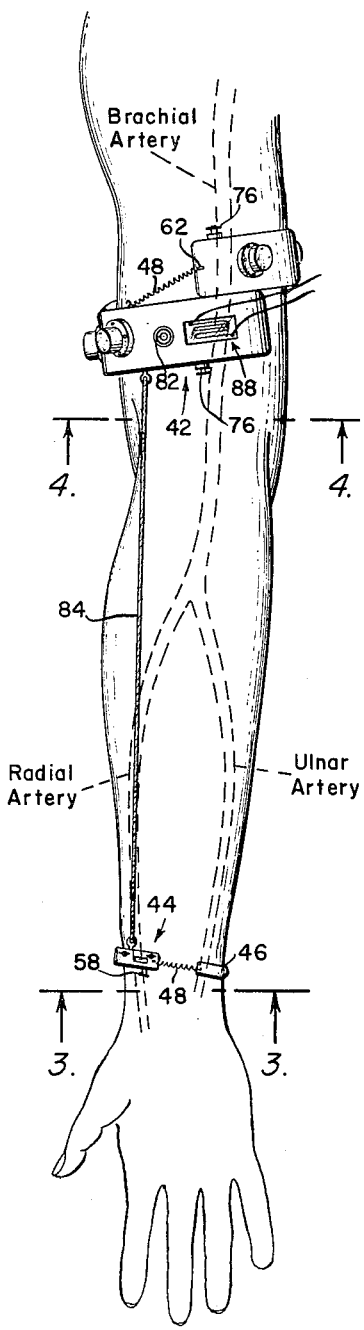
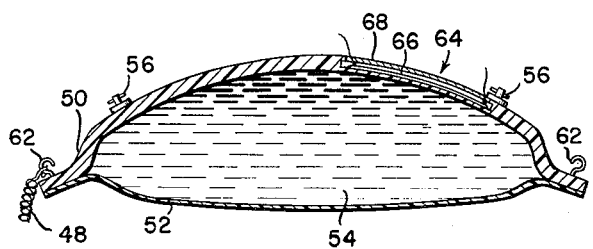
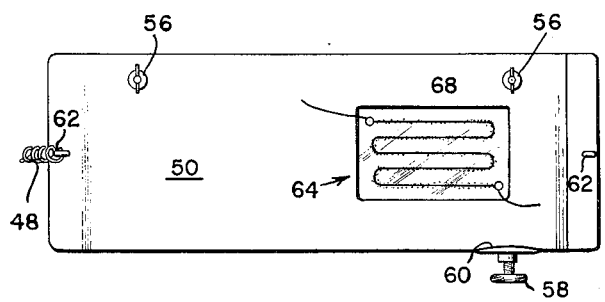
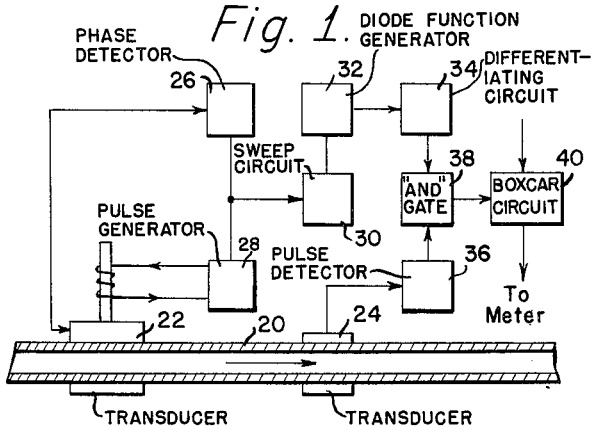
Peter F. Salisbury,
Tracy F. Wichmann,
INVENTORS.
BY.
Bernard Kriegel
ATTORNEY.

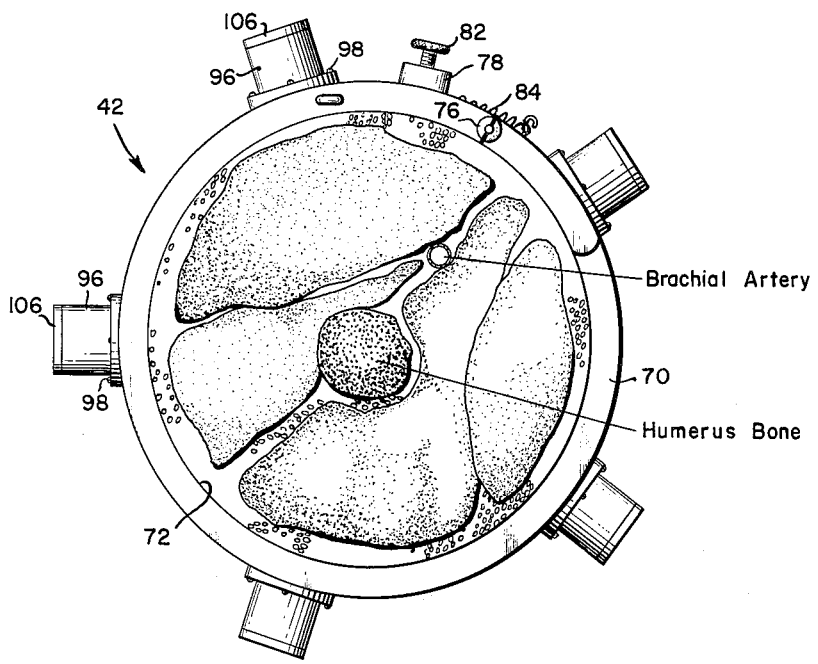
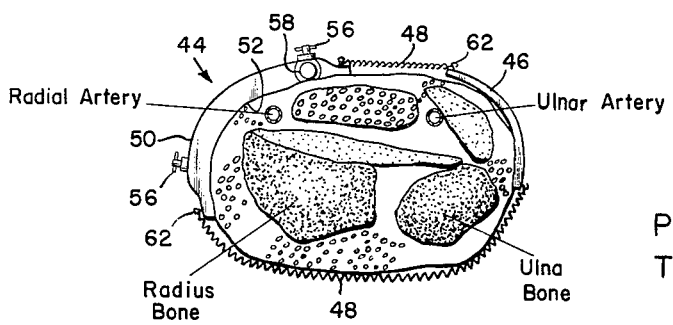

May 21, 1963     P. F. SALISBURY ET AL     3,090,377
BLOOD PRESSURE MEASUREMENT
Filed Oct. 30, 1961     5 Sheets-Sheet 3

Peter F. Salisbury,
Tracy F. Wichmann,
INVENTORS.
BY.

*Bernard Kriegel*

ATTORNEY.

May 21, 1963 P. F. SALISBURY ET AL 3,090,377
BLOOD PRESSURE MEASUREMENT
Filed Oct. 30, 1961 5 Sheets-Sheet 4

Peter F. Salisbury,
Tracy F. Wichmann,
INVENTORS.

BY.

Bernard Kriegel

ATTORNEY.

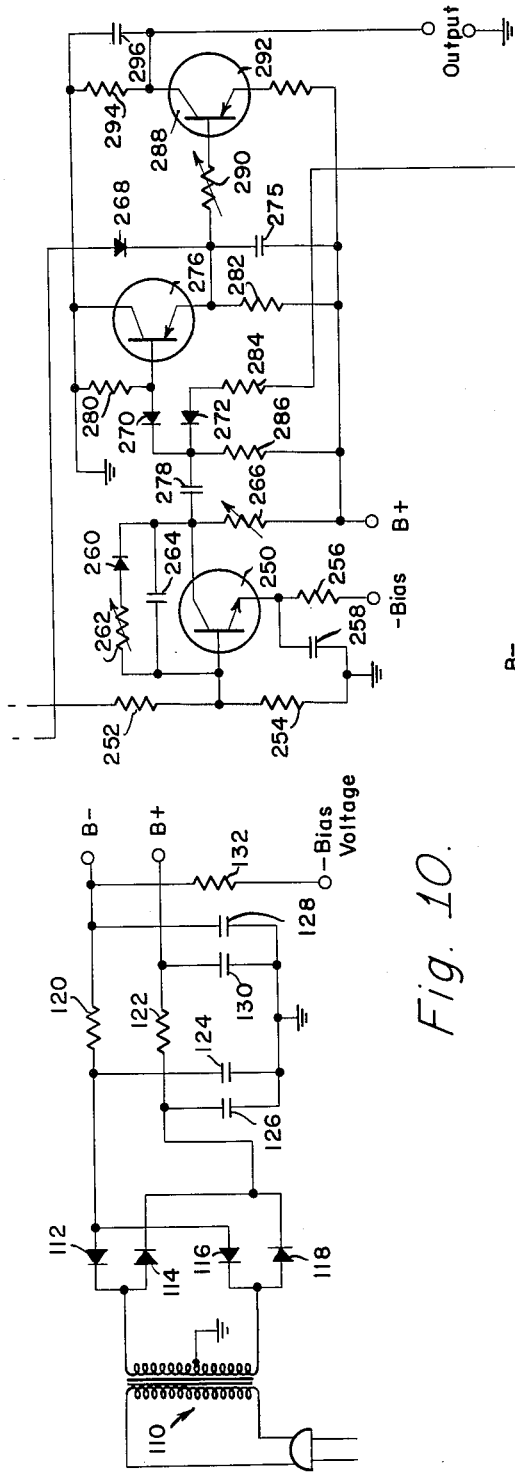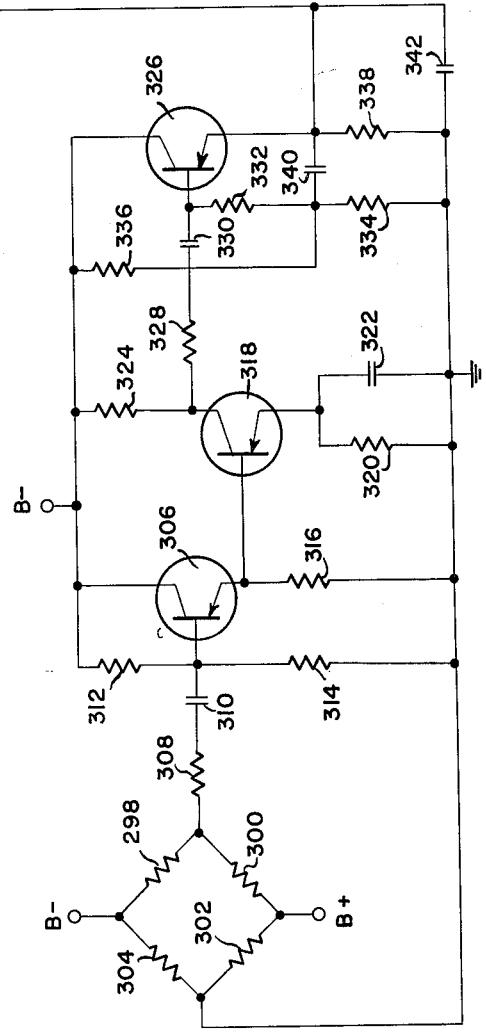
Fig. 10.
Peter F. Salisbury,
Tracy F. Wichmann,
INVENTORS.
BY.
*Bernard Kriegel*
ATTORNEY.

United States Patent Office 3,090,377
Patented May 21, 1963

3,090,377
BLOOD PRESSURE MEASUREMENT
Peter F. Salisbury, 11750 Canton Place, Studio City, Calif., and Tracy F. Wichmann, 4116 Green Bush Ave., Sherman Oaks, Calif.
Filed Oct. 30, 1961, Ser. No. 148,527
12 Claims. (Cl. 128—2.05)

This invention relates to an improved apparatus for the measurement or monitoring of blood pressure, and more particularly to an apparatus for the continuous recording of blood pressure by indirect measurement.

The arterial blood pressure, hereinafter referred to as blood pressure, is one of the most important parameters yielding information concerning the condition of an individual. Devices which yield a continuous or, at the very least, a frequently repeated measurement of blood pressure, satisfy an important need in clinical medicine as well as in the recently developed and highly important area of aviation, space and military medicine. The traditional method of measurement of blood pressure, which contemplates the use of a cuff and sphygmometer, is subject to a normal error of twenty-five percent (25%). In some instances the error has been found to be as large as fifty percent (50%) of the true simultaneously measured intra-arterial blood pressure. Further, it is impossible with this procedure to provide a continuous recording of blood pressure, and relatively infrequent readings are the best which can be obtained. The only presently available technique for obtaining accurate, continuous blood pressure recording is accomplished by the use of a pressure transducer connected with the lumen of an artery by a needle or cannula which penetrates the skin or the arterial wall. This is the so-called "direct" method of blood pressure monitoring. However, this system is subject to disadvantages. In order to avoid obstruction of the cannula with blood clots, the needle must be flushed periodically or the subject's blood must be made incoagulable. Such a device poses danger to the subject in that infection may result or that hemorrhage, clotting or other obstruction of the blood vessel may be caused. In addition, it is clear that such monitoring will cause discomfort or mental stress in the subject.

The present invention provides a method and apparatus for the practice thereof which indirectly and continuously measures the systemic arterial pressure. Such apparatus should ideally meet the following specifications:

(a) Systolic (i.e. peak) and diastolic (i.e. minimal) pressures should be continuously recorded;

(b) These pressures should be measured accurately;

(c) Sensing devices which generate the recorded or observed signal should be applied to regions of the body which do not "over-react." Examples of such over-reaction regions are the ears or fingertips of a subject. The blood pressure measured at such points can be decreased by cold air or by changes of total blood volume, while central blood pressure remains unchanged or increases. Thus, such measurements do not necessarily parallel the pressure in more central arteries;

(d) Sensors should not perforate the skin or penetrate into blood vessels;

(e) The act of measuring blood pressure should not interfere with the blood supply to parts of the body nor should the act of measuring modify the parameter which is being measured;

(f) Blood pressure monitoring should not cause discomfort or mental stress in the subject.

Briefly described, the present invention provides an apparatus for measuring the propagation in arteries of externally applied pulses of short duration. The velocity of such pulse waves is known to vary with blood vessel rigidity. In turn, blood vessel rigidity is known to vary directly with intra-vascular pressure. The apparatus forming the subject of the present invention provides an applied pulse of short duration to a chosen artery and measures the velocity of the resulting pulse wave. The apparatus further computes arterial blood pressure from the measured pulse wave velocity.

The present invention provides an apparatus which is not subject to any of the disadvantages discussed above in connection with prior art devices, and further provides all of the desired features listed above.

It is an object of the present invention to provide a continuous monitoring of blood pressure.

Another object of the present invention is to provide blood pressure measuring apparatus which records either systolic or diastolic pressures.

Still another object of the present invention is to provide accurate blood pressure measurements.

A further object of the present invention is to provide blood pressure measuring apparatus not requiring the use of a sensor which perforates the skin or penetrates into a blood vessel of a subject.

A still further advantage of the present apparatus is that the act of measuring blood pressure does not modify the blood pressure nor does the act of measuring interfere with the blood supply to parts of the body.

Yet another advantage is that blood pressure monitoring does not cause discomfort or mental stress in the subject.

This invention possesses many other advantages and has other objects which may be made more clearly apparent from a consideration of a form and method embodying the invention. This form and method are shown and described in the present specification and in the drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a schematic or block diagram of the present invention;

FIG. 2 is a diagrammatic representation of a human arm, showing the cuffs or transducers, forming part of the apparatus, in position;

FIG. 3 is a cross-section taken along the line 3—3 of FIG. 2;

FIG. 4 is a cross-section taken along the line 4—4 of FIG. 2;

FIG. 5 is a plan view of the distal transducer or cuff;

FIG. 6 is a cross-section through the transducer or cuff shown in FIG. 5;

FIG. 10 is a diagram of the remaining portion of the electrical and electronic circuitry of the apparatus.

Figure 7:
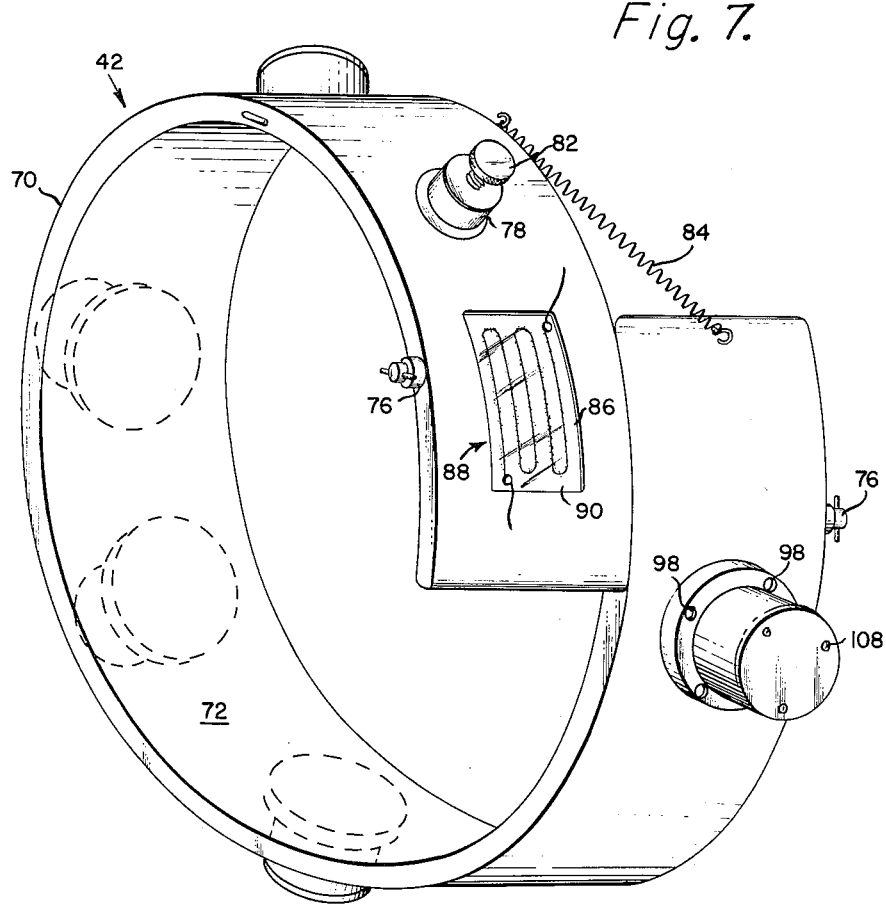
FIG. 7 is a perspective view of the proximal cuff or transducer.

The operation of the apparatus forming the subject of the present invention is based upon the principle that the elasticity of an arterial wall is a function of intra-arterial pressure. That is, the walls of arteries become more rigid (or less distensible) when the pressure in the vessels increases. It is also a fact that the velocities of the blood volume pulse, as well as that of the blood pressure pulse (the two are not identical), bear a direct relationship to the stiffness of the arterial wall. Accordingly, blood pressure may be measured by appropriate treatment of measurements of pulse wave velocity.

Naturally occurring pulse waves, generated by the ejection of blood from the left ventricle of the heart, do not provide suitable signals for the purpose of measuring blood pressure, because their ascending and descending slopes change too gradually to be useful for this purpose. Further, the shape of pressure pulses is changed as the wave travels in a centrifugal direction. With these conditions present, pulse wave velocity can be measured by using the peak of a naturally occurring pulse wave. In addition, naturally occurring pulse pressure waves include superimposed harmonic oscillations which have different characteristics, are reflected in varying modes, and may interfere with each other unpredictably.

The natural blood volume pulses travel at a velocity which is only about ten percent (10%) of that of the propagation velocity of the pressure pulse waves. These volume pulses can be measured readily, but are dampened to an extent which precludes accurate and consistent measurements of changes of blood pressure from their velocity.

The present invention uses the principle that any segment of a pressure pulse wave contour can be labelled or identified by brief (1–5 millisecond) superimposed square waves which modify the outline of the pressure pulse without significantly affecting the normal flow of blood. The modified pulse wave propagates in a centrifugal direction, and its outline can be recorded distally, as shown, or may be recorded proximately, if desired.

The present invention includes apparatus for imposing a brief monitoring square wave upon either the systolic peak, the diastolic plateau, or other desired segments of the pressure pulse wave. The apparatus constituting the present invention then measures the elapsed time between the imposition of the monitoring wave and the arrival of its leading edge at the distal sensing device. Suitable treatment of this measurement yields an indication of the intra-arterial blood pressure existing at that phase of the pulse wave upon which the monitoring wave was imposed.

The relationship of pulse wave velocity and blood pressure is given by:

$$V^2 = 4.86p - 0.0083p^2 - 42$$

in which V is the pulse velocity in meters per second and $p$ is the pressure in millimeters of mercury.

An approximation of this formula, which has been found to be accurate within 1.5%, is given by the relationship:

$$p \approx 12.2V - 130$$

Since electronic circuitry can measure time differences very accurately and conveniently, the present system determines the pulse velocity or blood pressure by measuring the time an applied pulse takes to travel a known, fixed distance. If L is the fixed distance, the blood pressure equation may be written as $$p \approx 12.2L/\Delta t - 130$$

in which $\Delta t$ is the measured time difference referred to above.

As shown in FIG. 1, a member such as an arm of the subject, which contains a convenient artery 20, has a pair of cuffs or transducers 22 and 24 applied thereto and spaced a known distance apart. The first transducer 22 contains means such as a solenoid for applying a marking pulse and sensing means to detect the systolic peak or other portion of the pressure pulse wave so that the applied pulse can be applied to the desired phase of the pressure pulse wave. The second transducer 24 comprises sensing means, such as a strain gauge, to sense the time that the applied pulse arrives at the second transducer 24. The transmission of pressure indications from the artery to the transducers and vice-versa may be accomplished by hydraulic pressure transmission, as shown in the present system, or by mechanical pressure transmission or other means.

When a desired portion of the pulse waves is sensed by a phase detector 26 connected to the first transducer 22, a pulse generator 28 is triggered and a short (1–5 millisecond) pulse is generated by the pulse generator 28. This pulse is also used to trigger a sweep circuit 30 which produces an electrical signal whose current increases with the passage of time. The sweep signal is used to drive a diode function generator 32 which produces, as an output, an electrical signal proportional to the natural logarithm of elapsed time. This signal is, in turn, sent to a differentiating circuit 34, which produces as an output an inverse voltage function. Thus, the output of the differentiaitng circuit 34 is an electrical signal whose magnitude is inversely proportional to the elapsed time. The second transducer 24 provides an electrical signal to a pulse detector 36 which detects the presence of the applied pulse at a distance L along the artery from the first transducer 22 and supplies, as its output, an electrical signal occurring simultaneously with the leading edge of the applied pulse.

An "and" gate 38 has two inputs. The first input to the "and" gate 38 receives the signal from the pulse detector 36 and the second input to the "and" gate 38 receives the signal from the differentiating circuit 34. When an electrical signal exists at the output of the pulse detector 36, the voltage appearing at the output of the differentiating circuit 34 is permitted to pass through the gate 38 to a boxcar circuit 40. The boxcar circuit 40 has a dual function. Its first function is to remember or store an electrical voltage transmitted to it. Its second function is to apply a fixed gain or amplification to an input voltage so that effectively the input voltage may be multiplied by a constant factor. This gain is controllable, and must be adjusted, in the present apparatus, to a factor equal to 12.2L. The output of the boxcar circuit 40 may also be controlled, by an appropriate negative bias, so that it is proportional to blood pressure in millimeters of mercury.

Variations of arterial elasticity, such as caused by age, arteriosclerosis, or other factors, may be compensated for by appropriate adjustments of the boxcar circuit, depending upon the characteristics of the subject under examination. Abnormal shapes of natural pulse waves will not interfere with the blood pressure measurement because the duration of the applied monitoring pulse or wave is far shorter than any significant portion of a natural wave, normal or abnormal.

The method described herein permits blood pressure measurements at the systolic, the diastolic, or other desired phases of the pulse wave. When both systolic and diastolic pressures are measured, separate channels are required for each phase. The same transducers can be used for both phases, and in some instances electronic circuits may be time-shared. However, since the strain gauge in the first transducer cannot easily be used to detect the diastolic phase, it is appropriate to measure diastole by making a measurement at a fixed time after the detection of systole. This measurement would merely require the insertion of fixed time delay elements between the detector 26 and the pulse generator 28, and between the pulse detector 36 and the gate 38. Such fixed time delay elements are well known in the art and will not be described in detail herein. The output of the boxcar circuit 40 may be observed by any convenient metering or recording unit.

In FIG. 2, a proximal cuff 42 and a distal cuff 44 are shown in position on the arm of a subject. The proximal cuff 42 is wrapped around the upper arm of the subject such that pressure may be exerted on the brachial artery and extends approximately 405° around the arm. As shown in FIG. 4, the brachial artery is embedded relatively deeply within the arm structure and in order to apply significant pressure to the artery, it is necessary to apply pressure uniformly around the circumference of the arm. FIG. 3 shows the distal cuff 44, which extends approximately 60° around the circumference of the lower arm. This cuff is maintained in contact with the radial artery and is used to sense the condition of the radial artery. Since this artery is relatively near the surface of the arm, it is not necessary to apply the cuff around the entire circumference of the lower arm. It should be understood that the brachial artery and the radial artery are, in actuality, a single blood vessel and can be considered as one artery for the purpose of this invention.

The cuff 44 is held in position by a strap 46 which extends around the circumference of the lower arm. A pair of springs 48 maintains a desired tension in the strap 46 while allowing venous drainage of blood to exist in sufficient quantity that normal circulation is not impaired. The details of construction of the proximal cuff 42 and the distal cuff 44 will be described hereinafter. A fixed distance L is maintained between the proximal cuff 42 and the distal cuff 44 by a non-elastic connecting member 84, which may be a chain or strap.

FIGS. 5 and 6 show the details of construction of the distal cuff 44. Supporting structure for the distal cuff 44 is provided by a semi-rigid shell 50 which supports the remainder of the structure. Attached to the shell 50 is an elastic thin plastic membrane 52 forming a space or cavity 54. The cavity 54 is filled with silicon oil or other hydraulically suitable medium which may be inserted into the cavity 54 through a pair of plug closed ports 56 which serve to fill or "bleed" the cavity 54. An adjusting screw 58 penetrates the shell 50 and is adapted to press on a stiff diaphragm 60 to control the pressure in the liquid filled cavity 54 and to serve as an effective "zero" adjust for said pressure.

A hook 62 is mounted at each side of the semi-rigid shell 50 and serves to connect the cuff 44 to the springs 48, as shown in FIG. 2.

The sensing portion of the cuff 44 comprises a strain gauge 64 which is bonded to a stiff diaphragm 66, which may be composed of mica or other suitable material. The diaphragm 66 containing the strain gauge 64 is inserted through the shell 50 into an aperture in said shell. A protective grid 68 is fitted over the diaphragm and strain gauge.

In operation, the membrane 52 is closely fitted against the arm of the subject such that the membrane 52 forms an intimate connection with the radial artery. Thus, changes in the condition of the radial artery will cause deformations of the membrane 52 and resulting changes in pressure which are transmitted by the silicon oil filling the cavity 54 to the diaphragm 66 which responds by deforming in accordance with the pressure variations applied thereto. Deformations of the diaphragm 66 will, in turn, deform the bonded strain gauge 64. The strain gauge 64 is of a type which changes its electrical resistance in accordance with changes in its shape. Thus, changes in the condition of the radial artery will produce corresponding changes in the electrical resistance of the strain gauge 64. These changes in electrical resistance are used as will be described hereinafter to sense the state of the radial artery.

Figure 8:
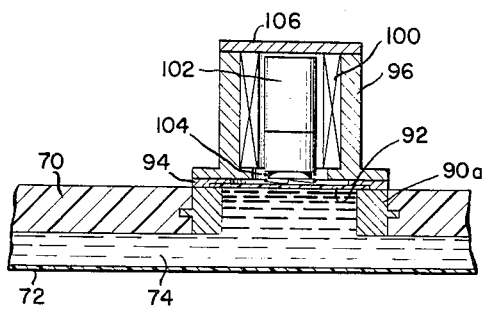
FIG. 8 is a cross-section of a portion of the transducer shown in FIG. 7.

FIGS. 7 and 8 show the details of construction of the proximal cuff 42 shown in FIG. 2. As stated above, the proximal cuff extends circumferentially around the upper arm of the subject, extending approximately 405 degrees. This provides an overlap as shown in FIGS. 2 and 7. Supporting structure for the proximal cuff 42 is provided by a semi-rigid shell 70 upon which is mounted the remainder of the structure. Attached to the shell 70 and in intimate contact with the upper arm of the subject is an elastic thin plastic membrane 72 forming a space or cavity 74. The cavity 74 is filled with silicon oil or other hydraulically suitable medium, which may be inserted into the cavity 74 through a pair of plug closed ports 76 which serve to fill and "bleed" the cavity 74. A cylinder 78 is also filled with silicon oil and is connected to the cavity 74. The cylinder 78 is provided with a piston 82 threaded therein, which is positioned axially along the cylinder to control the pressure in the cavity 74, acting as a "zero" adjust for such pressure. A tension spring 48 is connected to the shell 70 to retain the proximal cuff 42 in position on the arm of the subject. An aperture is provided in the shell 70 so that a stiff mica diaphragm 86, having a strain gauge 88 bonded thereto, may be inserted. The diaphragm 86 and strain gauge 88 serve to sense the condition of the brachial artery and operate in similar fashion to the mica diaphragm 66 and strain gauge 64 bonded to the distal cuff, and described in connection therewith. A protective grid 90 is fitted above the diaphragm 86 and the strain gauge 88.

The proximal cuff 42 also contains means for applying a marking pulse to the pressure pulse wave. A solenoid-spring arrangement applies a brief constriction to the arm of the subject, constricting the brachial artery and effectively notching the pressure pulse wave at any desired point. In order to preserve uniformity of pressure application to all areas of the arm of the subject, a plurality of constricting devices may be used, as shown.

The details of construction of a constricting device are shown in FIG. 8. A cylindrical support 90a is fitted into an aperture in the shell 70 and supports the remainder of the constricting apparatus. A flexible diaphragm 92, which may be composed of mica or other suitable material, is held in position by a retaining ring 94. A supporting shell 96 is secured to the cylindrical support 90 by a plurality of screws 98 (FIG. 7). The supporting shell 96 contains, and maintains the position of, a solenoid winding 100. A plunger 102 is adapted to move along the axis of the solenoid winding 100 and to provide pressure against the stiff diaphragm 92 upon the electrical actuation of the solenoid winding 100. A spring 104 retracts the solenoid plunger 102 when the solenoid winding 100 is not energized. A circular cap 106 encloses the constricting apparatus and is secured to the supporting shell 96 by a plurality of screws 108.

If more than one constricting device is used, each of the constricting devices is energized simultaneously by the application of an electrical pulse to the solenoid winding 100. When a pulse is received, the solenoid winding 100 is energized and causes the plunger 102 to press against the stiff diaphragm 92. The pressure thus produced will be transmitted uniformly throughout the hydraulic medium contained in the cavity 74 causing a constriction around the arm of the subject and notching the pressure pulse wave as desired.

The constricting device described above, while operable to produce the desired result, may be designed to operate in accordance with other principles. For example, a single solenoid arrangement could be used to actuate a plurality of hydraulically operated pistons which would in turn exert pressure upon the diaphragms 92. Alternatively, a magnetostrictive device could be used to apply the required constrictive force to the arm of the subject.

Figure 9:
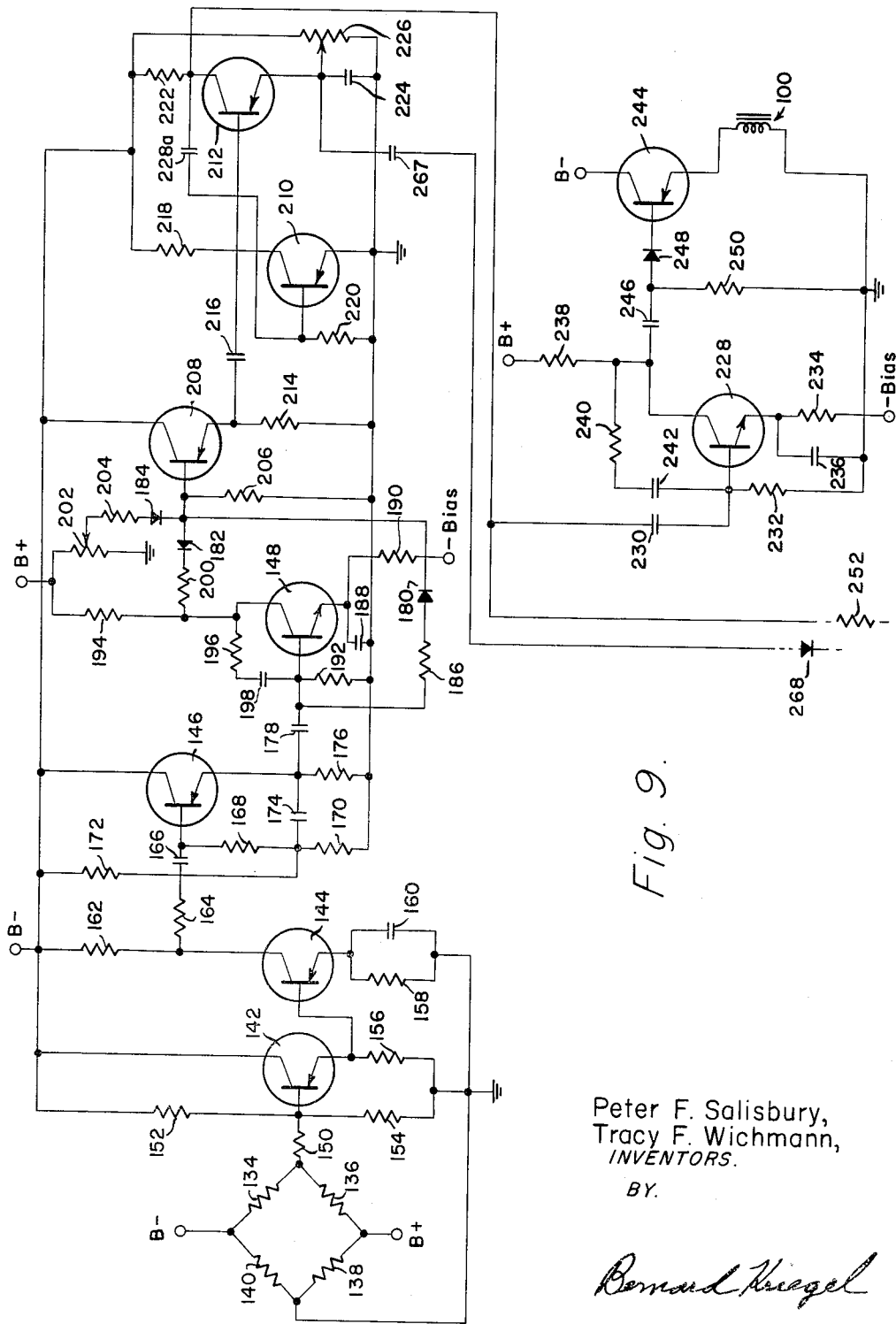
FIG. 9 is a diagram of a portion of the electrical and electronic circuitry of the apparatus.

FIGS. 9 and 10 show the details of the electrical and electronic portions of the present invention. This apparatus must receive signals in the form of changes in electrical resistance from each of the strain gauges 64 and 88, and must compute from these signals, the instantaneous blood pressure of the subject. In addition, the electrical and electronic apparatus must furnish an electrical pulse at the proper time and of the proper magnitude to actuate the solenoid windings 100. A complete description of this circuitry follows.

In the description which follows, the D.C. supply voltages are furnished by a full-wave rectifier circuit constructed according to well known principles of the prior art. A power transformer 110 has its primary winding connected across a 115 volt, 60 cycle, A.C. line. The secondary winding of the transformer 110 is centertapped and has its tap connected to ground. One end of the secondary winding of the power transformer 110 is connected to the cathode of a first diode 112 and to the anode of a second diode 114. The other end of the secondary winding of the power transformer 110 is connected to the cathode of a third diode 116 and the anode of a fourth diode 118. The anodes of diodes 112 and 116 are connected together and the cathodes of diodes 114 and 118 are connected together. The transformer diode combination described above provides full-wave rectification of the A.C. source.

The rectified A.C. voltage is filtered by an RC network comprising a resistor 120 connected in series with the anodes of the diodes 112 and 116 and a resistor 122 connected in series with the cathodes of diodes 114 and 118. A capacitor 124 is connected from the junction of the anodes of diodes 112 and 116 with the resistor 120 to ground. A second capacitor 126 is connected from the junction of the cathodes of diodes 114 and 118 with the resistor 122 to ground. A third capacitor 128 is connected between the opposite end of the resistor 120 and ground. A fourth capacitor 130 is connected between the opposite end of the resistor 122 and ground. The resistors 120 and 122 and the capacitors 124, 126, 128 and 130 form a filter network which converts the rectified A.C. voltages into D.C. voltages. The junction of the resistor 120 and the capacitor 128 is connected to an output terminal which provides a negative D.C. voltage (B minus), which may be approximately minus 22.5 volts. The junction of the resistor 122 and the capacitor 130 is connected to an output terminal which provides a positive D.C. voltage (B plus), which may be approximately plus 22.5 volts. A negative D.C. bias voltage, which may be approximately minus 13 volts is obtained by connecting a resistor 132 in series with the B minus output terminal. The power supply described above provides all of the supply voltages necessary for the operation of the electrical and electronic circuitry comprising the present invention.

The first sensing element or transducer, which forms a part of the proximal cuff described above, has been described as providing a varying electrical resistance. This resistance is shown as a resistance 134 and is connected in a bridge circuit with resistors 136, 138 and 140. That is, a first end of the resistance 134 is connected to a first end of the resistor 136. The second end of the resistor 136 is connected to a first end of the resistor 138. The second end of the resistor 138 is connected to a first end of the resistor 140. The second end of the resistor 140 is connected to the second end of the resistance 134. The junction of the resistors 134 and 140 is also connected to the B minus supply. The junction of the resistors 136 and 138 is also connected to the B plus supply. The junction of the resistors 138 and 140 is connected to ground. The choice of values of the resistors 136, 138 and 140 depends upon the value of the resistance 134; however, the resistor 140 should have a value equal to the mean value of the strain gauge resistance 134, and the resistors 138 and 136 must have the same values. The junction of the resistors 134 and 136 forms the input to a peak detector circuit.

The peak detector serves to detect the systolic peak of the blood pressure wave. This peak detector comprises four transistors 142, 144, 146 and 148, with their associated circuitry. The transistors 142, 144 and 146 together form a three-stage amplifier. The transistor 148 forms a part of a differentiating circuit which will be described hereinafter.

The output of the bridge circuit described above, appearing at the junction of the resistors 134 and 136 forms the input to the first amplification stage, the transistor 142. The transistor 142 is a PNP transistor having an emitter terminal, a base terminal, and a collector terminal. The output of the bridge circuit is fed to the base terminal of the transistor 142 through an isolating resistor 150. The base terminal of the transistor 142 is also connected to B minus through a resistor 152, and to ground through a resistor 154. The resistors 152 and 154 control the base bias of the transistor 142. The output current of the transistor 142 appears across a resistor 156, which is connected at one end to the emitter terminal of the transistor 142 and, at its other end, to ground. The collector terminal of the transistor 142 is connected to B minus.

The output of the transistor 142 appears at the emitter terminal, which is connected directly to the base terminal of the PNP transistor 144. The emitter terminal of the transistor 144 is connected to one end of a parallel combination of a resistor 158 and a capacitor 160. The other end of the parallel combination is connected to ground. The parallel combination of the resistor 158 and the capacitor 169 provides D.C. bias for the transistor 144. A resistor 162 is connected to the collector terminal of the transistor 144 at one end, and has its other end connected to B minus. The output current of the transistor 144 appears across the resistor 162. The output of the transistor 144 appears at the collector terminal of the transistor 144 and is connected to the base terminal of the PNP transistor 146 through a resistor 164 and a capacitor 166. The resistor 164 is an isolation resistor limiting the current into the capicitor 166. The capacitor 166 provides D.C. isolation between the transistors 144 and 146. The base terminal of the transistor 146 is connected through a pair of resistors 168 and 170 to ground. The junction of the resistors 168 and 170 is connected to B minus through a resistor 172. The resistors 168, 170 and 172 control the bias of the transistor 146. The collector terminal of the transistor 146 is directly connected to B minus. The emitter terminal of the transistor 146 is connected to a capacitor 174, which has its other end connected to the junction of the resistors 168 and 170. The capacitor 174 provides an A.C. short circuit. A resistor 176 is connected, at one end, to the emitter terminal of the transistor 146, and has its other end connected to ground. The output current of the transistor 146 appears across the resistor 176.

The three-stage amplifier described above includes the transistors 142, 144 and 146. The first two stages of amplification, provided by the transistors 142 and 144 provide a high voltage gain. The third stage of amplication, provided by the transistor 146, provides a high power output. This output appears at the emitter terminal of the transistor 146. A capacitor 178 is connected to the emitter terminal of the transistor 146 and provides D.C. isolation, i.e., it allows only the A.C. portion of the output signal to pass.

Peak detection is accomplished by three diodes 180, 182 and 184, forming a gate circuit. At systole, the signal appearing at the capacitor 178 has a high positive polarity. This signal is coupled to the anode terminal of the diode 180 through a resistor 186 which limits the current supplied to the anode terminal of the diode 180. The diode 180 is effectively actuated by the peak of the applied signal. The signal appearing at the capacitor 178 is differentiated and applied to the cathode terminal of the diode 182. The differentiation of this signal enables the detection of the polarity of the signal. This is necessary since the negative going part of the systolic pulse must not actuate the circuit. This is important since the low pressure reversal portion of the pressure wave could conceivably be amplified and mistaken for the systolic peak. The differentiation is accomplished by the transistor 148 and its associated circuitry.

The capacitor 178 is connected to the base terminal of the transistor 148. This transistor, which is an NPN transistor, is biased by a common bias circuit including a capacitor 188 and a resistor 190. The capacitor 188 has one terminal connected to the emitter terminal of the transistor 148 and has its second terminal connected to ground. The resistor 190 has its first terminal connected to the emitter terminal of the transistor 148, and has its opposite end connected to the negative bias supply. The input voltage to the transistor 148 is developed across a resistor 192, which is connected between the base terminal of the transistor 148 and ground. The collector terminal of the transistor 148 is connected to the B plus supply through a resistor 194 across which the output current of the transistor 148 appears. A differentiating feedback loop is provided from the output of the transistor 148 to its input. This connection comprises a resistor 196 connected to the collector terminal of the transistor 148, and a capacitor 198 in series with the resistor 196. The capacitor 198 is connected to the base terminal of the transistor 148. The output current from the transistor 148 is applied to the cathode terminal of the diode 182 through a resistor 200 which serves to limit the current supplied to the cathode terminal.

The third element of the gate formed by the diodes 180, 182 and 184 is supplied by the diode 184. This diode essentially sets a minimum or threshold level. The threshold level is controlled by a potentiometer 202 which is connected between B plus and ground and which has its variable tap connected to a resistor 204. The resistor 204 is, in turn, connected to the anode terminal of the diode 184. The potentiometer 202 and the resistor 204 set the desired threshold level. When the current through the diodes 180 and 182 exceeds that threshold set by the diode 184, current flows in a resistor 206, which is connected to the junction of the cathode terminals of the diodes 180 and 184 and the anode terminal of the diode 182. The other end of the resistor 206 is connected to ground. Thus current flow through the resistor 206 represents the occurrence of the systolic peak. The current flow is detected by a pulse generator which comprises transistors 208, 210 and 212, along with associated circuitry.

The transistor 208 amplifies the current flow through the resistor 206. The junction of the cathode terminals of diodes 180 and 184 and the anode terminal of the diode 182 is connected to the base terminal of the transistor 208, which is a PNP transistor. The collector terminal of the transistor 208 is connected to B minus. The emitter terminal of the transistor 208 is connected to ground through a resistor 214, which generates the output voltage of the transistor 208. This voltage, through a coupling capacitor 216, triggers a monostable multivibrator formed by the transistors 210 and 212 and their associated circuitry. The transistor 210, which is a PNP transistor, has its collector terminal connected to B minus through a resistor 218. The output voltage of the transistor 208, appearing at the capacitor 216 is also supplied to the collector terminal of the transistor 210 by a connection from the capacitor 216 to the collector terminal. The emitter terminal of the transistor 210 is connected to ground. The base terminal of the transistor 210 is connected to ground through a resistor 220.

The transistor 212, which is a PNP transistor, has its collector terminal connected to B minus through a resistor 222. The base terminal of the transistor 212 is also connected to the output of the transistor 208 by a connection to the collector terminal of the transistor 210. The emitter terminal of the transistor 212 is connected to ground through a capacitor 224 and is also connected to B minus through a potentiometer 226. The potentiometer 226 has its ends connected between B minus and ground and its adjustable center tap connected to the emitter terminal of the transistor 212. A capacitor 228a is connected between the base terminal of the transistor 210, and the collector terminal of the transistor 212.

The monostable multivibrator operates as follows. In the absence of an input pulse, the transistor 210 conducts, i.e., current flows between the emitter and collector terminals of the transistor 210. Simultaneously, the transistor 212 is biased to collector current cutoff by a suitable adjustment of the potentiometer 226. When the circuit is in this condition, a negative trigger pulse applied to the collector terminal of the transistor 210 through the small coupling capacitor 216 will establish current flow through the transistor 212, leaving the base terminal of the transistor 210 positive with respect to ground and decreasing the collector current of the transistor 210. When the collector current of the transistor 212 has risen sufficiently to permit a loop gain of unity, the transistor 210 will become rapidly cut off. This action produces a positive pulse of magnitude approximately 9 volts and having a rise time of a few microseconds, at the collector of the transistor 212. The circuit remains in this condition until the charge on the capacitor 228 has leaked off through the resistor 220 and through the reverse direction of the transistor 210. At this time, emitter current flows in the transistor 210, and the circuit will restore itself to its original condition. The capacitor 224 provides an A.C. short circuit and the potentiometer 226, as discussed, provides the necessary bias. The resistors 218 and 222 provide the collector current necessary to produce the output voltages which drive the transistors 210 and 212. The wave form produced by the monostable multivibrator is used throughout the rest of the circuitry to control its timing.

One of the functions of the electrical and electronic circuitry is to provide a pulse which may be used to actuate the solenoid windings 100 shown in FIG. 8. This pulse is obtained by suitable treatment of one of the outputs of the multivibrator. The leading edge of the monostable multivibrator output pulse is differentiated by a transistor 228 and its associated circuitry, and is used to drive the solenoids 100 shown in FIG. 8. Electrical connection is made between the collector terminal of the transistor 212 and the base terminal of the transistor 228 through a capacitor 230. A resistor 232 is connected between the base terminal of the transistor 228 and ground. The input circuit to the transistor 228, comprising the capacitor 230 and the resistor 232, provides a necessary time constant. The emitter terminal of the transistor 228 is connected to ground through a capacitor 236 and is also connected to the bias supply through a resistor 234. The resistor 234 and the capacitor 236 provide the proper bias for operation of the transistor 228. The transistor 228, which is an NPN transistor, has its collector connected to B plus through a resistor 238. The output of the transistor 228 appears across the resistor 238. The feedback loop for differentiation comprises a resistor 240 and a capacitor 242 connected, in series, between the collector terminal of the transistor 228 and the base terminal of the transistor 228.

The output of the transistor 228, appearing at the collector terminal, is connected to the base terminal of a transistor 242 through a capacitor 246 and a diode 248, in series. A resistor 250 is connected between the junction of the capacitor 246 and the diode 248 and ground. The capacitor 246 and the resistor 250 provide the necessary time constant for correct operation of the transistor 244, and the diode 248 ensures that the solenoid will not be fired when the monostable multivibrator resets. The collector terminal of the transistor 244, which is a PNP transistor, is connected to B minus. The emitter terminal of the transistor 244, which provides the output of the transistor, is connected to one side of a solenoid coil 100. The remaining side of the solenoid coil is connected to ground. If more than one solenoid is used the coils 100 of each of the solenoids are connected in parallel between the emitter terminal of the transistor 244 and ground. With the above described circuitry, proper operation of the solenoids 100 is obtained.

To provide the necessary inverse time function, the flat, approximately 9 volt, positive pulse which forms the output of the multivibrator circuit, is integrated by a transistor 250 and its associated circuitry to generate a sweep signal. The output of the pulse generator is connected to the input of the sweep generator by a connection between the collector terminal of the transistor 212 and the base terminal of the transistor 250 through a resistor 252. The base terminal of the transistor 250 is further connected to ground through a resistor 254. The resistors 252 and 254 constitute a voltage divider which apportions the correct input voltage to the transistor 250. Correct bias for the operation of the transistor 250 is provided by an RC combination comprising a resistor 256 connected between the emitter terminal of the NPN transistor 250 and the negative bias supply, and a capacitor 258, connected between the emitter terminal of the transistor 250 and ground.

A feedback loop provides the necessary integration. This loop comprises a diode 260 and a variable resistance 262, connected, in series, between the collector terminal of the transistor 250 and the base terminal of the transistor 250. A capacitor 264 is connected directly between the collector terminal of the transistor 250 and the base terminal of the transistor 250, forming a parallel combination with the series combination of the potentiometer 262 and the diode 260. The presence of the diode 260 in the feedback loop causes a non-linearity in the integration and thereby, through the adjustment of the potentiometer 262, the wave form constituting the output of the transistor 250 can be made to very closely approximate the inverse time function. A variable resistance or potentiometer 266 is connected between the collector terminal of the transistor 250 and B plus, and essentially adjusts the overall integrator gain to multiply the inverse time function by a desired constant.

Three diodes 268, 270 and 272, along with associated circuitry, from a boxcar detector. This circuit essentially receives the inverse time sweep voltage and stores this voltage at the value attained when an output pulse from the second strain gauge occurs. The voltage is stored in a capacitor 275, after having been amplified by a transistor 276. Before the initiation of the sweep voltage, the capacitor 275 is essentially discharged by a negative pulse from the emitter terminal of the transistor 212 which is connected to the capacitor 275 through a coupling capacitor 267 and a diode 268. The diode 268 prevents the leak-off of the voltage to be stored on the capacitor 275.

The sweep voltage is applied to the base terminal of the transistor 276 through a coupling capacitor 278 and the diode 270, connected in series, between the collector terminal of the transistor 250 and the base terminal of the transistor 276. The base terminal of the transistor 276 is also connected to ground through a resistor 280. The emitter of the transistor 276, which is a PNP transistor, is connected to B plus through a resistor 282. The collector terminal of the transistor 276 is directly connected to ground.

The distal strain gauge 64, as will be described hereinafter, provides a signal, which, after appropriate treatment, is introduced to the boxcar circuit through the diode 272. The diode 270 has its cathode connected to the capacitor 278 and its anode connected to the base terminal of the transistor 276. The diode 272 has its cathode connected to the junction of the capacitor 278 and the cathode of diode 270, and has its anode connected to the source of the treated strain gauge signal through a resistor 284. A resistor 286 connects the junction of the cathode of the diode 270 and the cathode of the diode 272 to B plus.

Considering now the input to the transistor 276, the inverse time sweep begins and charges the capacitor 275 through the transistor 276 and the diode 270. This continues until the diode 272 becomes positive with respect to the diode 270, at which time the diode 270 stops conducting and the charge on the capacitor 274 remains constant. The resistor 280 biases the diode 270 and the resistor 286 biases the diode 272 for correct operation. The resistor 284 effectively isolates the input pulse from the distal strain gauge signal and the resistor 282 is used to bias the transistor 276. The output of the transistor 276 is connected to the input of an amplifier comprising a transistor 288 and associated circuitry. This connection is effected through a variable resistor or potentiometer 290 which connects the emitter terminal of the transistor 276 to the base terminal of the transistor 288. The emitter terminal of the transistor 288, which is a PNP transistor, is connected to B plus through a resistor 292. The bias for the operation of the transistor 288 is provided by a resistor 294 connected between the collector terminal of the transistor 288 and ground and a capacitor 296 also connected between the collector terminal of the transistor 288 and ground. The variable resistance or potentiometer 290 is used to adjust the gain or amplification of the circuit to accommodate any desired type of output recording device or alarm. Such an output device would be connected to the collector terminal of the transistor 288.

The distal strain gauge 64 supplies, as its output, a varying electrical resistance 298. This resistance is used in a bridge circuit with resistors 300, 203 and 304. The bridge is formed by connecting a first end of the resistance 298 to a first end of the resistor 300. The second end of the resistor 300 is connected to a first end of the resistor 302. The second end of the resistor 302 is connected to a first end of the resistor 304. The second end of the resistor 304 is connected to the second end of the resistance 298. The junction of the resistances 300 and 302 is connected to B plus, and the junction of the resistances 298 and 304 is connected to B minus. The junction of the resistors 302 and 304 is connected to ground.

The output of the bridge circuit is connected to an amplifying stage comprising a transistor 306 and associated circuitry. This connection is accomplished by a resistor 308 connected to the junction between the resistances 298 and 300, at one end, and to a first terminal of a capacitor 310, at its other end. The capacitor is connected at its second terminal to the base terminal of the transistor 306. The resistor 308 and the capacitor 310 effectively isolate the strain gauge bridge circuit as an input to the transistor 306. The base terminal of the transistor 306, which is a PNP transistor, is connected to B minus through a resistor 312. The base terminal of the transistor 306 is also connected to ground through a resistor 314. The resistors 312 and 314 bias the transistor 306 for proper operation. The collector terminal of the transistor 306 is directly connected to B minus, and the emitter terminal of the transistor 306 is connected to ground through a resistor 316 which develops the output of the transistor 306.

The emitter terminal of the transistor 306 is directly connected to the base terminal of a transistor 318. The emitter of the transistor 318 is connected to a parallel combination of a resistor 320 and a capacitor 322, which is connected, in turn, to ground. The resistor 320 and the capacitor 322 provide bias for the transistor 318. The collector terminal of the transistor 318 is connected to B minus through a resistor 324, across which the output of the transistor 318 is developed.

The collector terminal of the transistor 318 is connected to the base terminal of a transistor 326 through a series combination of a resistor 328 and a capacitor 330. The resistor 328 acts to limit the current to the capacitor 330. The capacitor 330 provides D.C. isolation between the transistor 318 and the transistor 326. The transistor 326 is used in an emitter follower circuit. The base terminal of the transistor 326 is connected to ground through a series combination of a resistor 332 and a second resistor 334. The junction of the resistors 332 and 334 is connected to B minus through a resistor 336. The emitter of the transistor 326, which is a PNP transistor, is connected to ground through a resistor 338 which serves as the emitter follower. A capacitor 340 is connected between the emitter terminal of the transistor 326 and the junction of the resistors 332 and 334. The emitter follower circuit is biased by the combination of the resistors 332 and 334, the capacitor 340 and the resistor 336. A capacitor 342 is connected between the emitter terminal of the transistor 326 and ground. This capacitor tends to integrate the voltage appearing at the emitter terminal of the transistor 326. The capacitor 342 is connected to the resistor 284 as has been described above, and supplies the signal from the distal strain gauge to the boxcar circuit described above.

The operation of the apparatus comprising the present invention has been described above in detail, however, the procedural steps involved in making blood pressure measurements will again be summarized.

The proximal cuff 42 is wrapped around the upper arm of the subject, connecting the spring 84 to the shell 70, so that the cuff 42 is retained in position around the arm of the subject. The strain gauge 88, mounted on the cuff 42, may now sense the condition of the brachial artery, and a marking pulse may be applied to a desired portion of the pressure pulse wave by the constricting device forming a part of the cuff 42.

The distal cuff 44 is placed in contact with the radial artery of the subject, at a fixed distance from the proximal cuff 42. This fixed distance is determined by mounting the cuff 44 such that the connecting member 84 is extended to its full length. The distal cuff 44 is retained in position by connecting the springs 48 and the strap 46 to the shell 50. The strain gauge 64 may now sense the condition of the radial artery.

Both the proximal and distal cuffs being in position, the electrical and electronic circuitry shown in FIGS. 9 and 10 will perform all the necessary functions and computations to provide an accurate and continuous indication of the blood pressure of the subject to any convenient metering or recording unit which may be electriccally connected to the collector terminal of the transistor 288.

There has thus been described improved apparatus for the measurement of blood pressure which yields a continuous recording of blood pressure by indirect measurement. Although one embodiment of the present invention has been described with great particularity, it is evident that other embodiments differing only in detail may also be produced, which would perform the same function as the apparatus described.

In addition, modified methods of operation could also be devised. For example, rather than the single pulse provided by the present apparatus, a continuous series of pulses of relatively high frequency compared with the natural pulse wave could also be applied. The arterial pressure would then be given by the phase relationship between the applied and detected waves.

Simple threshold circuits could also be incorporated into the present invention so that a bell could be rung or a compensating action controlled when the apparatus indicates intentionally selected critical blood pressure levels.

We claim:

1. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to said first electrical signals for detecting that portion of said electrical signals corresponding to the systolic peak of said blood pressure pulse wave and for providing a first electrical pulse indicative of the time of occurrence thereof, marking means adapted to be mounted adjacent the artery and responsive to said first electrical pulse for notching said blood pressure pulse wave at the systolic peak of said wave upon the occurrence of said first electrical pulse, a second transducer responsive to the condition of the artery and adapted to be mounted adjacent thereto at a fixed distance from said first transducer for sensing the blood pressure wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, signal generating means electrically coupled to said peak detector for providing an electrical signal whose magnitude is inversely proportional to the time elapsed after the occurrence of an actuating signal, said means adapted to be actuated by said first electrical pulse, and output means electrically coupled to said signal generating means and to said signal providing means and responsive to said electrical signal and to said second electrical pulse for registering the magnitude of said electrical signal at the time of occurrence of said second electrical pulse, said magnitude being indicative of the blood pressure within the artery.

2. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to such first electrical signals for detecting that portion of said electrical signals corresponding to the systolic peak of said blood pressure pulse wave and for providing a first electrical pulse indicative of the time of occurrence thereof, marking means adapted to be mounted adjacent the artery and responsive to said first electrical pulse for notching said blood pressure pulse wave at the systolic peak of said blood pressure wave upon the occurrence of said first electrical pulse, a second transducer responsive to the condition of the artery and adapted to be mounted adjacent thereto at a fixed distance from said first transducer for sensing the blood pressure wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, sweep generating means electrically coupled to said peak detector for providing an electrical signal whose magnitude is proportional to the time elapsed after the occurrence of an actuating signal, said means adapted to be actuated by said first electrical pulse, function generating means electrically coupled to said sweep generating means for providing an electrical signal whose magnitude is inversely proportional to the time elapsed after said occurrence of an actuating signal, and output means electrically coupled to said function generating means and to said signal providing means and responsive to said inverse electrical signal and to said second electrical pulse for registering the magnitude of said inverse electrical signal at the time of occurrence of said second electrical pulse, said magnitude being indicative of the blood pressure within the artery.

3. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to said first electrical signals for detecting that portion of said electrical signals corresponding to the systolic peak of said blood pressure pulse wave, pulse generating means electrically coupled to said peak detector for providing a first electrical pulse indicative of the time of occurrence of said systolic peak, constricting means adapted to be mounted adjacent the artery and responsive to said first electrical pulse for applying a constriction to the artery at the systolic peak at said blood pressure wave upon the occurrence of said first electrical pulse, said constriction notching said blood pressure pulse wave, a second transducer responsive to the condition of the artery and mounted adjacent thereto at a fixed distance from said first transducer for sensing the blood pressure wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, signal generating means electrically coupled to said pulse generating means for providing an electrical signal whose magnitude is inversely proportional to the time elapsed after the occurrence of an actuating signal, said means adapted to be actuated by said first electrical pulse, and output means electrically coupled to said signal generating means and to said signal providing means and responsive to said electrical signal and to said second electrical pulse for registering the magnitude of said electrical signal at the time of occurrence of said second electrical pulse, said magnitude being indicative of the blood pressure within the artery.

4. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to such first electrical signals for detecting that portion of said electrical signals corresponding to the systolic peak of said blood pressure pulse wave, pulse generating means electrically coupled to said peak detector for providing a first electrical pulse indicative of the time of occurrence of said systolic peak, constricting means adapted to be mounted adjacent the artery and responsive to said first electrical pulse for applying a constriction to the artery at the systolic peak of said blood pressure wave upon the occurrence of said first electrical pulse, said constriction notching said blood pressure pulse wave, a second transducer responsive to the condition of the artery and mounted adjacent thereto at a fixed distance from said first transducer for sensing the blood pressure pulse wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, sweep generating means electrically coupled to said pulse generating means for providing an electrical signal whose magnitude is proportional to the time elapsed after the occurrence of an actuating signal, said means adapted to be actuated by said first electrical pulse, function generating means electrically coupled to said sweep generating means for providing an electrical signal whose magnitude is inversely proportional to the time elapsed after said occurrence of an actuating signal, and output means electrically coupled to said function generating means and to said signal providing means and responsive to said inverse electrical signal and to said second electrical pulse for registering the magnitude of said inverse electrical signal at the time of occurrence of said second electrical pulse, said magnitude being indicative of the blood pressure within the artery.

5. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to said first electrical signals for detecting that portion of said electrical signals corresponding to the systolic peak of said blood pressure pulse wave and for providing a first electrical pulse indicative of the time of occurrence thereof, marking means adapted to be mounted adjacent the artery and responsive to said first electrical pulse for notching said blood pressure pulse wave at the systolic peak of said blood pressure wave upon the occurrence of said first electrical pulse, a second transducer responsive to the condition of the artery and adapted to be mounted adjacent thereto at a fixed distance from said first transducer for sensing the blood pressure pulse wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, sweep generating means electrically coupled to said peak detector for providing an electrical signal whose magnitude is proportional to the time elapsed after the occurrence of an actuating signal, said means adapted to be actuated by said first electrical pulse, function generating means electrically coupled to said sweep generating means for providing an electrical signal whose magnitude is proportional to the natural logarithm of the time elapsed after said occurrence of the actuating signal, differentiating means electrically coupled to said function generating means for providing an electrical signal whose magnitude is inversely proportional to the time elapsed after said occurrence of the actuating signal, and output means electrically coupled to said differentiating means and to said signal providing means and responsive to said differentiated electrical signal and to said second electrical pulse for registering the magnitude of said electrical signal at the time of occurrence of said second electrical pulse, said magnitude being indicative of the blood pressure within the artery.

6. Apparatus according to claim 5 in which a first cuff is adapted to be mounted on a member of the subject whose blood pressure is being measured, in intimate contact with the member and adjacent the artery whose condition is being sensed, said first cuff comprising support means, and having said first transducer mounted in said support means, and having said constricting means mounted in said support means.

7. Apparatus according to claim 5 in which a first cuff is adapted to be mounted on a member of the subject whose blood pressure is being measured, in intimate contact with the member and adjacent the artery whose condition is being sensed, said first cuff comprising support means, said first transducer being mounted in said support means, and said constricting means being mounted in said support means, and a second cuff adapted to be mounted on a member of the subject whose blood pressure is being measured, in intimate contact with the member and adjacent the artery whose condition is being sensed, said second cuff comprising support means, said second transducer being mounted in said support means.

8. Apparatus according to claim 5 in which a first cuff is adapted to be mounted on a member of the subject whose blood pressure is being measured, said first cuff comprising support means containing a cavity filled with hydraulic fluid, a flexible membrane mounted on said support means and in intimate contact with the member and with said hydraulic fluid and adjacent the artery whose condition is being sensed, said membrane responsive to variations in the pressure within the artery for transmitting said pressure variations to said hydraulic fluid and for receiving pressure variations from said hydraulic fluid, said first transducer mounted in said support means and in intimate contact with said hydraulic fluid for receiving pressure variations from said hydraulic fluid and for providing said first electrical signals in accordance therewith, and in which said constricting means are mounted in said support means and in intimate contact with said hydraulic fluid for transmitting pressure variations to said hydraulic fluid, said membrane receiving said pressure variations and applying said constriction to the artery.

9. Apparatus according to claim 5 in which a first cuff is adapted to be mounted on a member of the subject whose blood pressure is being measured, said first cuff comprising support means contacting a cavity filled with hydraulic fluid, a flexible membrane mounted on said support means and in intimate contact with the member and with said hydraulic fluid and adjacent the artery whose condition is being sensed, said membrane responsive to variations in the pressure within the artery for transmitting said pressure variations from said hydraulic fluid and for receiving pressure variations from said hydraulic fluid, said first transducer mounted in said support means and in intimate contact with said hydraulic fluid for receiving pressure variations from said hydraulic fluid and for providing said first electrical signals in accordance therewith, and in which said constricting means are mounted in said support means and in intimate contact with said hydraulic fluid for transmitting pressure variations to said hydraulic fluid, said membrane receiving said pressure variations and applying said constriction to the artery, and a second cuff adapted to be mounted on a member of the subject whose blood is being measured, said second cuff comprising support means containing a cavity filled with hydraulic fluid, a flexible membrane mounted on said support means and in intimate contact with the member and with said hydraulic fluid and adjacent the artery whose condition is being sensed, said membrane responsive to variations in the pressure within the artery for transmitting said pressure variations to said hydraulic fluid, and in which said second transducer is mounted in said support means and in intimate contact with said hydraulic fluid for receiving pressure variations from said hydraulic fluid and for providing said second electrical signals in accordance therewith.

10. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to said first electrical signals for detecting that portion of said electrical signals corresponding to the systolic peak of said blood pressure pulse wave, pulse generating means electrically coupled to said peak detector for providing a first electrical pulse indicative of the time of occurrence of said systolic peak, constricting means adapted to be mounted adjacent the artery and responsive to said first electrical pulse for applying a constriction to the artery at the systolic peak of said blood pressure wave upon the occurrence of said first electrical pulse, said constriction notching said blood pressure pulse wave, a second transducer responsive to the condition of said artery and mounted adjacent thereto at a fixed distance from said first transducer for sensing the blood pressure pulse wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, sweep generating means electrically coupled to said pulse generating means for providing an electrical signal whose magnitude is proportional to the time elapsed after the occurrence of an actuating signal, said means adapted to be actuated by said first electrical pulse, function generating means electrically coupled to said sweep generating means for providing an electrical signal whose magnitude is proportional to the natural logarithm of the time elapsed after said occurrence of the actuating signal, differentiating means electrically coupled to said function generating means for providing an electrical signal whose magnitude is inversely proportional to the time elapsed after said occurrence of the actuating signal, and output means electrically coupled to said differentiating means and to said signal providing means and responsive to said differentiated electrical signal and to said second electrical pulse for registering the magnitude of said electrical signal at the time occurrence of said second electrical pulse, said magnitude being indicative of the blood pressure within the artery.

11. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to said first electrical signals for detecting that portion of said electrical signals corresponding to the systolic peak of said blood pressure pulse wave, pulse generating means electrically coupled to said peak detector for providing a first electrical pulse indicative of the time of occurrence of said systolic peak, constricting means adapted to be mounted adjacent the artery and responsive to said first electrical pulse for applying a constriction to the artery at the systolic peak of said blood pressure pulse wave upon the occurrence of said first electrical pulse, said constriction notching said blood pressure pulse wave, a second transducer responsive to the condition of the artery and mounted adjacent thereto at a fixed distance from said first transducer for sensing the blood pressure pulse wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, and means electrically coupled to said pulse generating means and to said signal providing means and responsive to said first and second electrical pulses for providing an output signal proportional to the elapsed time between the occurrence of said first and second pulses, said output signal being indicative of the blood pressure within the artery, in which a first cuff is adapted to be mounted on a member of the subject whose blood pressure is being measured, said first cuff comprising support means containing a cavity filled with hydraulic fluid, a flexible membrane mounted on said support means and adapted to be placed in intimate contact with the member and with said hydraulic fluid and adjacent the artery whose condition is being sensed, said membrane responsive to variations in the pressure within the artery for transmiting said pressure variations to said hydraulic fluid and for receiving pressure variations from said hydraulic fluid, said first transducer mounted in said support means and in intimate contact with said hydraulic fluid for receiving pressure variations from said hydraulic fluid and for providing said first electrical signals in accordance therewith, and in which said constricting means are mounted in said support means and in intimate contact with said hydraulic fluid for transmitting pressure variations to said hydraulic fluid, said membrane receiving said pressure variations and applying said constriction to the artery.

12. Apparatus for the continuous measurement of blood pressure comprising a first transducer responsive to the condition of an artery and adapted to be mounted adjacent thereto for sensing the blood pressure pulse wave within the artery and for providing first electrical signals proportional thereto, a peak detector electrically coupled to said first transducer and responsive to said first electrical signals for detecting that portion of said electrical signals corresponding to the systolic peak of said blood pressure pulse wave, pulse generating means electrically coupled to said peak detector for providing a first electrical pulse indicative of the time of occurrence of said systolic peak, constricting means adapted to be mounted adjacent the artery and responsive to said first electrical pulse for applying a constriction to the artery at the systolic peak of said blood pressure pulse wave upon the occurrence of said first electrical pulse, said constriction notching said blood pressure pulse wave, a second transducer responsive to the condition of the artery and mounted adjacent thereto at a fixed distance from said first transducer for sensing the blood pressure pulse wave within the artery and for providing second electrical signals proportional thereto, signal providing means electrically coupled to said second transducer and responsive to said second electrical signals for detecting said notch in said blood pressure pulse wave and for providing a second electrical pulse indicative of the time of occurrence thereof, and means electrically coupled to said pulse generating means and to said signal providing means and responsive to said first and second electrical pulses for providing an output signal proportional to the elapsed time between the occurrence of said first and second pulses, said output signal being indicative of the blood pressure within the artery, in which a first cuff is adapted to be mounted on a member of the subject whose blood pressure is being measured, said first cuff comprising support means containing a cavity filled with hydraulic fluid, a flexible membrane mounted on said support means and in intimate contact with the member and with said hydraulic fluid and adjacent the artery whose condition is being sensed, said membrane responsive to variations in the pressure within the artery for transmitting said pressure variations from said hydraulic fluid and for receiving pressure variations from said hydraulic fluid, said first transducer mounted in said support means and in intimate contact with said hydraulic fluid for receiving pressure variations from said hydraulic fluid and for providing said first electrical signals in accordance therewith, and in which said constricting means are mounted in said support means and in intimate contact with said hydraulic fluid for transmitting pressure variations to said hydraulic fluid, said membrane receiving said pressure variations and applying said constriction to the artery, and a second cuff adapted to be mounted on a member of the subject whose blood is being measured, said second cuff comprising support means containing a cavity filled with hydraulic fluid, a flexible membrane mounted on said support means and in intimate contact with the member and with said hydraulic fluid and adjacent the artery whose condition is being sensed, said membrane responsive to variations in the pressure within the artery for transmitting said pressure variations to said hydraulic fluid, and in which said second transducer is mounted in said support means and in intimate contact with said hydraulic fluid for receiving pressure variations from said hydraulic fluid and for providing said second electrical signals in accordance therewith.

References Cited in the file of this patent

UNITED STATES PATENTS

| | | |
|---|---|---|
| 2,658,505 | Sheer | Nov. 10, 1953 |
| 2,756,741 | Campanella | July 31, 1956 |
| 2,827,040 | Gilford | Mar. 18, 1958 |
| 2,865,365 | Newland | Dec. 23, 1958 |
| 2,875,750 | Boucke | Mar. 3, 1959 |
| 2,944,542 | Barnett | July 12, 1960 |

FOREIGN PATENTS

| | | |
|---|---|---|
| 314,141 | Switzerland | Mar. 31, 1956 |

OTHER REFERENCES

Pettit: "Electronic Switching, Time, and Pulse Circuits," TK 7870 P4-McGraw-Hill, 1959, pages 38–39.